United States Patent

Tamai

[11] Patent Number: 6,064,184
[45] Date of Patent: May 16, 2000

[54] CHARGING CIRCUIT FOR CHARGING A RECHARGEABLE BATTERY AND FOR PREVENTING CONSUMPTION OF RECHARGEABLE BATTERY POWER BY THE CHARGING CIRCUIT

[75] Inventor: Mikitaka Tamai, Tsuna-gun, Japan

[73] Assignee: Sanyo Electric Co., Ltd., Osaka, Japan

[21] Appl. No.: 09/236,611

[22] Filed: Jan. 25, 1999

[30] Foreign Application Priority Data

Jan. 28, 1998 [JP] Japan .................................. 10-016262

[51] Int. Cl.[7] .................................................. H01M 10/46
[52] U.S. Cl. .......................................... 320/134; 320/136
[58] Field of Search .................................. 320/127, 128, 320/132, 134, 135, 136, 137

[56] References Cited

U.S. PATENT DOCUMENTS

| | | | |
|---|---|---|---|
| 5,539,299 | 7/1996 | Fernandez et al. | 320/134 |
| 5,710,505 | 1/1998 | Patino | 320/134 |
| 5,783,322 | 7/1998 | Nagai et al. | 429/7 |
| 5,789,900 | 8/1998 | Hesegawa et al. | 320/132 |

FOREIGN PATENT DOCUMENTS 7-29554  1/1995  Japan .

Primary Examiner—Edward H. Tso
Attorney, Agent, or Firm—Weneroth, Lind & Ponack, L.L.P.

[57] ABSTRACT

A charging circuit is provided with a charge control switch connected in series with a rechargeable battery, and a current sensing circuit to determine whether or not current flows through the rechargeable battery. A charging control circuit is also included to determine a charge state of the rechargeable battery and to control operation of the charge control switch. Further an operation control circuit for allowing operation of the charging control circuit in response to current flow through the rechargeable battery determined by the current sensing circuit.

22 Claims, 3 Drawing Sheets

PRIOR ART

CHARGING CIRCUIT FOR CHARGING A RECHARGEABLE BATTERY AND FOR PREVENTING CONSUMPTION OF RECHARGEABLE BATTERY POWER BY THE CHARGING CIRCUIT

This application is based on application No. 16262 filed in Japan on Jan. 28, 1998, the contents of which are incorporated hereinto by reference.

BACKGROUND OF THE INVENTION

This invention relates to a charging circuit for charging a rechargeable battery, and to a battery pack containing the charging circuit.

FIG. 3 shows a battery pack containing a prior art charging circuit disclosed in Japanese Non-examined Patent Publication HEI 7-29554 issued on Jan. 31, 1995. In this figure, 31A and 31B are a pair of charge-discharge terminals which are connected to a charging power supply or to a discharge load. 32 is a rechargeable battery connected between the charge-discharge terminal pair 31A and 31B. Q31 is a charge control switch, which is a MOSFET (metal oxide semiconductor field effect transistor) connected in series with the rechargeable battery 32 between the charge-discharge terminal pair 31A and 31B. 33 is a charging control circuit which measures the state of charge of the rechargeable battery 32 and controls the operation of the charge control switch Q31. 34 is a detection switch which detects a connection of the battery pack and the charging power supply. The detection terminal of the detection switch 34 is exposed from the battery pack.

When a charging power supply is connected to the battery pack with this configuration, connection is detected by the detection switch 34 and power is supplied from the charging power supply to the charging control circuit 33. As a result, the charging control circuit 33 begins operation, and functions to control charging and puts the rechargeable battery 32 in an optimum state of charge.

This circuit prevents wasted consumption of the rechargeable battery power by the charging control circuit 33 when the battery pack is removed from the charging power supply. However, in addition to the charge-discharge terminals 31A and 31B, indispensable for the rechargeable battery 32 charging, a detection terminal, not inherently necessary simply for rechargeable battery 32 charging, is required to control the operation of the detection switch 34.

It is an object of the present invention to provide a charging circuit and a battery pack containing that charging circuit which has a simple configuration and which can reliably control charging while limiting wasted power consumption by the charging control circuit.

SUMMARY OF THE INVENTION

The charging circuit of the present invention is provided with a charge control switch connected in series with a rechargeable battery, a current sensing circuit to determine whether or not a charging current is flowing through the rechargeable battery, a charging control circuit to determine the state of charge of the rechargeable battery and to control the operation of the charge control switch, and an operation control circuit to allow the operation of the charging control circuit in response to current flow through the rechargeable battery determined by the current sensing circuit.

The current sensing circuit determines when a charging power supply has been disconnected from the rechargeable battery, and the charging control circuit responds to this result by putting the charge control switch in the on state.

Further, the battery pack of the present invention contains the charging circuit described above.

Since the charging circuit of the present invention has a configuration provided with a charge control switch connected in series with a rechargeable battery, a current sensing circuit to determine whether or not the charging current is flowing through the rechargeable battery, a charging control circuit to determine the state of charge of the rechargeable battery and to control the operation of the charge control switch, and an operation control circuit to allow the operation of the charging control circuit in response to current flow through the rechargeable battery determined by the current sensing circuit, charging control can be reliably performed with a simple circuit structure while limiting wasted power consumption by the charging control circuit.

Furthermore, since the current sensing circuit determines when the charging power supply has been disconnected from the rechargeable battery, and the charging control circuit responds to this result by putting the charge control switch in the on state, correct execution of rechargeable battery discharge is allowed after the completion of charging.

The above and further objects and features of the invention will more fully be apparent from the following detailed description with accompanying drawings.

DETAILED DESCRIPTION OF THE INVENTION

Figure 1:
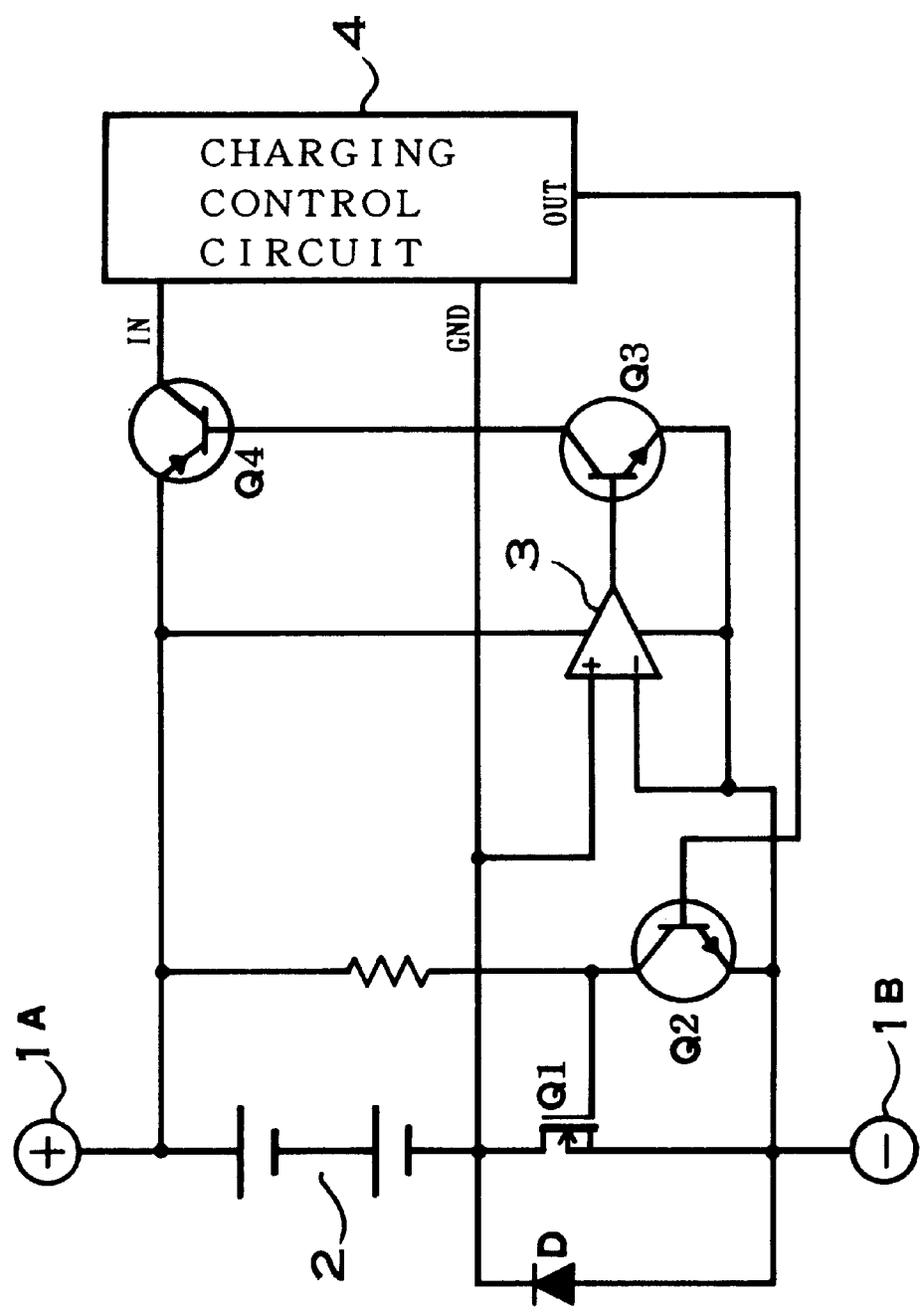
FIG. 1 is a circuit diagram showing an embodiment of the present invention.

FIG. 1 is a circuit diagram showing an embodiment of the present invention. FIG. 1 shows a battery pack provided with a charging circuit of the present invention. In this figure, 1A and 1B make up a pair of charge-discharge terminals which are connected to a charging power supply or a discharge load. 2 is two lithium ion rechargeable battery cells (termed the rechargeable battery below) connected between the charge-discharge terminals 1A and 1B. Q1 is a charge control switch, which is a MOSFET connected in series with the rechargeable battery 2 between the charge-discharge terminals 1A and 1B. A parasitic diode D of the MOSFET is connected to be forward biased in a direction allowing discharge of the rechargeable battery 2.

Q2 is a first transistor with its collector connected to the charge-discharge terminal 1A and a gate of the charge control switch Q1, and with its emitter connected to the charge-discharge terminal 1B. 3 is a current sensing circuit, which is a difference amplifier for determining whether or not charging current is flowing through the rechargeable battery 2 via the charging circuit based on a voltage developed across the charge control switch Q1 as a result of its internal resistance. The current sensing circuit 3 issues a HIGH signal when the charging current is flowing through the rechargeable battery 2.

Here, in place of the difference amplifier, a voltage detection circuit may be provided as the current sensing circuit. Further, a sensing resistor may be provided separately from the charge control switch Q1.

4 is a charging control circuit which determines the state of charge of the rechargeable battery 2 and controls the operation of the charge control switch Q1. This charging control circuit 4 determines whether or not the rechargeable battery 2 has reached full charge based on measurement of rechargeable battery 2 voltage. When full charge of the rechargeable battery 2 is detected, the charging control circuit 4 issues a HIGH signal from its OUT terminal, which is connected to a base of the first transistor Q2.

Q3 and Q4 are second and third transistors which operate in response an output from the current sensing circuit 3 and make up the operation control circuit for controlling the operation of the charging control circuit 4. In particular, the third transistor Q4 is connected between the charge-discharge terminal 1A and an IN terminal of the charging control circuit 4.

When a charging power supply (although not illustrated, a power supply generating >4.2V/cell is used for the present embodiment) is connected to the charge-discharge terminals 1A and I B in the configuration above, the charging current flows through the rechargeable battery 2. Accompanying this charging current, a voltage drop develops across the source and drain terminals of the charge control switch Q1. The current sensing circuit 3 outputs a HIGH signal as a result of detecting this voltage.

In response to the HIGH output signal from the current sensing circuit 3, the second and third transistors Q3 the Q4 are turned on, and voltage applied to the charge-discharge terminal 1A is inputted into the IN terminal of the charging control circuit 4. As a result, the charging control circuit 4 begins to function, and control of rechargeable battery 2 charging is conducted.

The charging control circuit 4, which has begun operation, measures the rechargeable battery 2 voltage. Subsequently, when full charge is detected for the rechargeable battery 2, the charging control circuit 4 issues a HIGH signal from its OUT terminal. As a consequence of this signal, the first transistor Q2 is turned on. The charge control switch Q1 turns off due to the first transistor Q2 being in the on state, and rechargeable battery 2 charging is suspended.

In this manner, even after suspension of charging, as long as the charging power supply is connected to the charge-discharge terminals 1 A and 1 B, the charging control circuit 4 remains in operation. This is because the voltage [(power supply voltage)-(rechargeable battery 2 voltage)] at the noninverting input terminal of the difference amplifier, which makes up the current sensing circuit 3, is greater than the voltage at the inverting input terminal of the difference amplifier. Consequently, the current sensing circuit 3 continues to output a HIGH signal.

Subsequently, when the charging power supply is removed from the charge-discharge terminals 1A and 1 B, the current sensing circuit 3 output becomes a LOW signal. Consequently, the second and third transistors Q3 and Q4 are turned off, and the charging control circuit 4 goes into a nonoperational state preventing unnecessary power consumption from the rechargeable battery 2.

At this time, the OUT terminal of the charging control circuit 4 goes into a high impedance state turning off the first transistor Q2 and turning on the charge control switch 01. Therefore, rechargeable battery 2 discharge is not conducted through the parasitic diode D, but rather is conducted in an optimal fashion through the charge control switch Q1.

Figure 2:
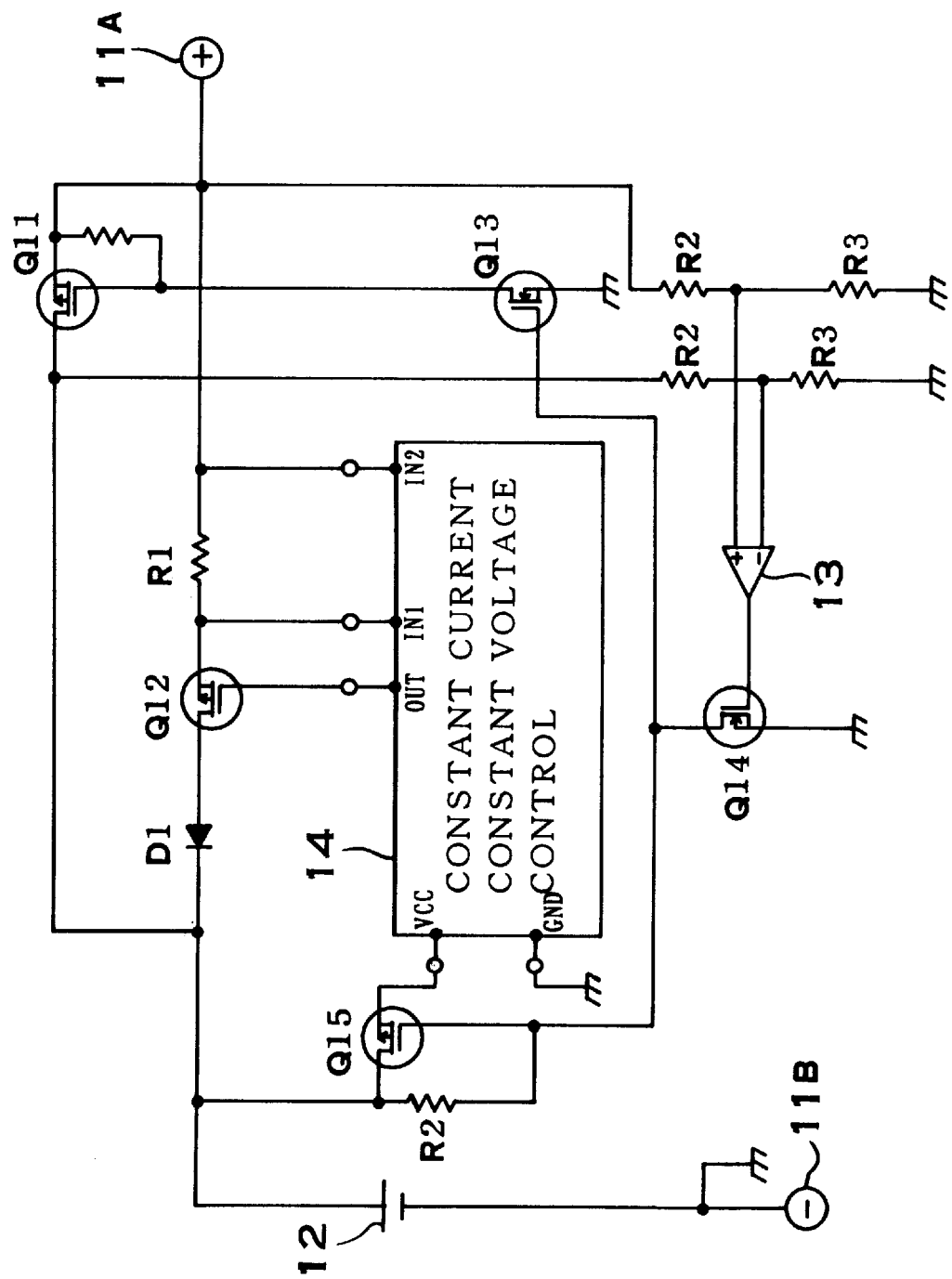
FIG. 2 is a circuit diagram showing another embodiment of the present invention.
Figure 3:
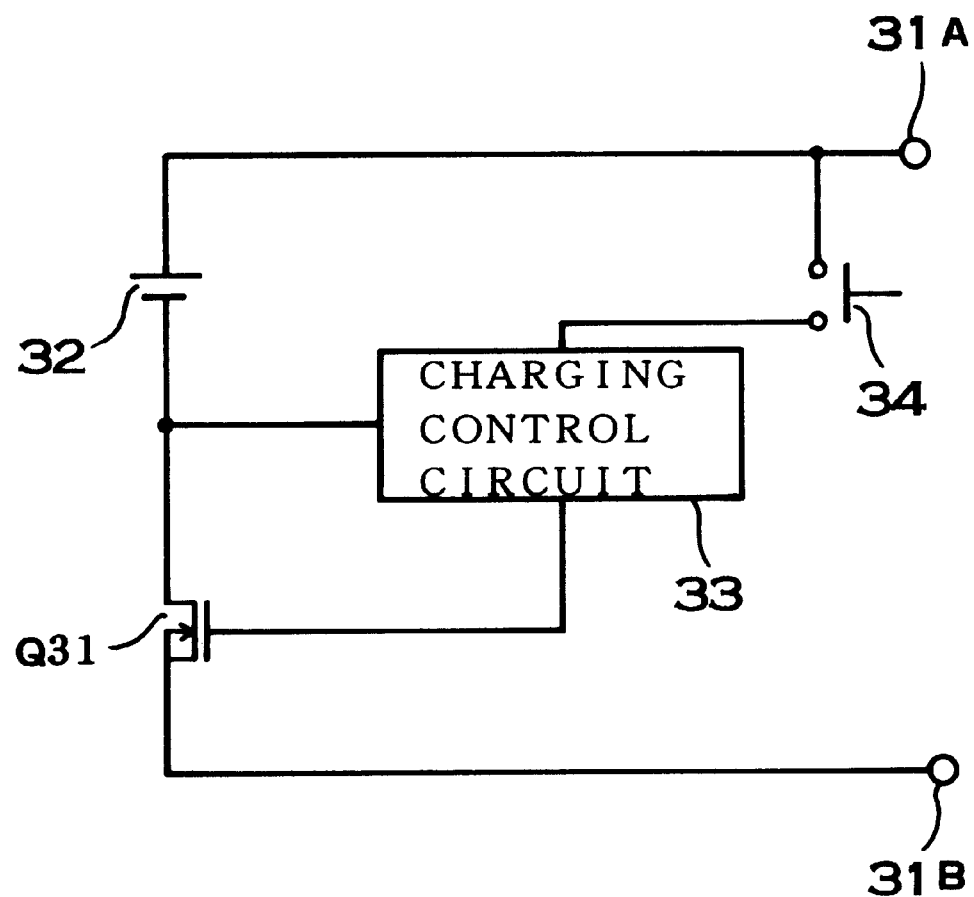
FIG. 3 is a circuit diagram showing a prior art embodiment.

Turning to FIG. 2, a circuit diagram of another embodiment of the present invention is shown. This figure also shows a battery pack provided with a charging circuit of the present invention. 11 A and 11 B make up a pair of charge-discharge terminals which are connected to a charging power supply or a discharge load. 12 is two lithium ion rechargeable battery cells (termed the rechargeable battery below) connected between the charge-discharge terminals 11A and 11B. Q11 and Q12 are first and second charge control switches, which are MOSFET devices connected in series with the rechargeable battery 12 between the charge-discharge terminals 1A and 1B. The first charge control switch Q11 and the second charge control switch Q12 are connected in parallel.

Q13 is a fourth transistor and is connected to a gate of first charge control switch Q11. 13 is a current sensing circuit, which is a difference amplifier to determine whether or not charging current flows through the rechargeable battery 12 based on a voltage developed across the first charge control switch Q11 as a result of its internal resistance. The current sensing circuit 13 issues a HIGH signal when charging current is flowing through the rechargeable battery 12.

14 is a charging control circuit which determines the state of charge of the rechargeable battery 12 and controls the operation of the second charge control switch Q12. This charging control circuit 14 comprises circuitry to perform constant voltage and constant current charging of the rechargeable battery 12. Constant current control is conducted until the rechargeable battery 12 reaches its fully charged voltage, and once the fully charged voltage is reached, constant voltage control is conducted. For this reason, the charging control circuit 14 inputs charging voltage and charging current via its IN1 terminal and IN2 terminal, and appropriately controls the second charge control switch Q12.

Q14 and Q15 are fifth and sixth transistors which operate in response to an output from the current sensing circuit 13 and make up the operation control circuit for controlling operation of the charging control circuit 14. In particular, the sixth transistor Q15 is connected between the charge-discharge terminal 11A and the Vcc terminal of the charging control circuit 14.

When a charging power supply is connected to the charge-discharge terminals 11A and 11B in the configuration above, charging current flows through the rechargeable battery 12. Accompanying this charging current, a voltage drop is developed across source and drain terminals of the first charge control switch Q11. The current sensing circuit 13 outputs a HIGH signal as a result of detecting this voltage.

In response to the HIGH output signal from the current sensing circuit 13, the fifth and sixth transistors Q14 and Q15 are turned on, and rechargeable battery 12 voltage is input to the Vcc terminal of the charging control circuit 14. As a result, the charging control circuit 14 begins operation.

The charging control circuit 14, which has begun operation, controls the second charge control switch Q12 and performs constant current charging or constant voltage charging according to the rechargeable battery 12 voltage. The rechargeable battery 12 is thereby charged via the second charge control switch Q12.

In response to the fifth transistor Q14 in the on state, the fourth transistor Q13 is turned off. As a result, the first charge control switch Q11 is also turned off and battery charging through this branch of the circuit is prevented.

Subsequently, when the charging power supply is removed from the charge-discharge terminals 11A and 11B, the current sensing circuit 13 output becomes a LOW signal. Consequently, the fifth and sixth transistors Q14 and Q15 are turned off, and the charging control circuit 14 goes into a nonoperational state preventing unnecessary power consumption from the rechargeable battery 12.

Further, the fourth transistor Q13 goes to the on state turning on the first charge control switch Q11. Consequently, rechargeable battery 12 discharge takes place in an optimal fashion through the first charge control switch Q11.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or the equivalence of such metes and bounds thereof are therefore intended to be embraced by the claims.

What is claimed is:

1. A charging circuit for a rechargeable battery, the charging circuit comprising:

a first charge control switch being arranged for electrical connection in series with the rechargeable battery;

a current sensing circuit operable to determine whether or not a charging current for charging the rechargeable battery is flowing through the charging circuit;

a charging control circuit operable to determine a charge state of the rechargeable battery and operable to control operation of said first charge control switch; and an operation control circuit operable to prevent operation of said charging control circuit unless said current sensing circuit determines that the charging current for charging the rechargeable battery is flowing through the charging circuit.

2. A charging circuit as recited in claim 1, further comprising:

a charging power supply being arranged for electrical connection with the rechargeable battery, said current sensing circuit operable to detect removal of said charging power supply from the rechargeable battery; and wherein said charging control circuit is operable to place said first charge control switch in an on state when said charging power supply is removed.

3. A charging circuit as recited in claim 1, wherein said current sensing circuit comprises a difference amplifier operable to detect a voltage across said first charge control switch to sense the charging current.

4. A charging circuit as recited in claim 1, wherein said current sensing circuit comprises a voltage detection circuit operable to detect a voltage across said first charge control switch to sense the charging current.

5. A charging circuit as recited in claim 1, wherein said operation control circuit comprises a transistor arranged for electrical connection between the rechargeable battery and said charging control circuit.

6. A charging circuit as recited in claim 1, further comprising:

a second charge control switch electrically connected in parallel to said first charge control switch;

wherein said charging control circuit is operable to place said second charge control switch in an on state; and wherein, when said second charge control switch is in the on state, the second charge control switch is operable to place said first charge control switch in an off state, allowing for charging of the rechargeable battery.

7. A charging circuit as recited in claim 6, wherein said second charge control switch is electrically connected in series with a diode to pass a current in a direction to charge the rechargeable battery; and wherein said charging control circuit is operable to place said first charge control switch in the off state and said second charge control switch in the on state thereby allowing charging of the rechargeable battery, and said charging control circuit is further operable to place said first charge control switch in an on state and said second charge control switch in an off state thereby preventing charging of the rechargeable battery.

8. A charging circuit as recited in claim 6, wherein said first and second charge control switches comprise FET devices.

9. A charging circuit as recited in claim 6, wherein said charging control circuit is operable to place said first charge control switch in the off state when said current sensing circuit detects the charging current.

10. A charging circuit as recited in claim 1, wherein said charging control circuit is operable to sense a voltage of the rechargeable battery for determining when the rechargeable battery is fully charged, and said charging control circuit is further operable to place said first charge control switch in an on state when the rechargeable battery is fully charged.

11. A charging circuit as recited in claim 1, wherein said charging control circuit is operable to charge the rechargeable battery with a constant voltage and a constant current.

12. A charging circuit for a rechargeable battery, the charging circuit comprising:

a pair of charge-discharge terminals, each of said pair of charge-discharge terminals being arranged for electrical connection on opposite sides of the rechargeable battery;

a charge control switch being arranged for electrical connection in series with the rechargeable battery;

a current sensing circuit operable to determine whether or not a charging current for charging the rechargeable battery flows through the charging circuit;

a charging control circuit operable to determine a charge state of the rechargeable battery and operable to control operation of said charge control switch; and an operation control circuit operable to prevent operation of said charging control circuit unless said current sensing circuit determines that the charging current for charging the rechargeable battery is flowing through the charging circuit.

13. A charging circuit as recited in claim 12, further comprising:

a charging power supply being arranged for electrical connection with the rechargeable battery, said current sensing circuit operable to detect removal of said charging power supply from the rechargeable battery; and wherein said charging control circuit is operable to place said first charge control switch in an on state when said charging power supply is removed.

14. A charging circuit as recited in claim 12, wherein said current sensing circuit comprises a difference amplifier which is operable to detect a voltage across said first charge control switch to sense the charging current.

15. A charging circuit as recited in claim 12, wherein said current sensing circuit comprises a voltage detection circuit operable to detect a voltage across said first charge control switch to sense the charging current.

16. A charging circuit as recited in claim 12, wherein said operation control circuit comprises a transistor arranged for electrical connection between the rechargeable battery and said charging control circuit.

17. A charging circuit as recited in claim 12, further comprising:
- a second charge control switch electrically connected in parallel to said first charge control switch;
- wherein said charging control circuit is operable to place said second charge control switch in an on state; and
- wherein, when said second charge control switch is in the on state, the second charge control switch is operable to place said first charge control switch in an off state, allowing for charging of the rechargeable battery.

18. A charging circuit as recited in claim 17, wherein said second charge control switch is electrically connected in series with a diode to pass a current in a direction to charge the rechargeable battery; and
- wherein said charging control circuit is operable to place said first charge control switch in the off state and said second charge control switch in the on state thereby allowing charging of the rechargeable battery, and said charging control circuit is further operable to place said first charge control switch in an on state and said second charge control switch in an off state thereby preventing charging of the rechargeable battery.

19. A charging circuit as recited in claim 17, wherein said first and second charge control switches comprise FET devices.

20. A charging circuit as recited in claim 17, said charging control circuit is operable to place said first charge control switch in the off state when said current sensing circuit detects the charging current.

21. A charging circuit as recited in claim 12, wherein said charging control circuit is operable to sense a voltage of the rechargeable battery for determining when the rechargeable battery is fully charged, and said charging control circuit is further operable to place said first charge control switch in an on state when the rechargeable battery is fully charged.

22. A charging circuit as recited in claim 12, wherein said charging control circuit is operable to charge the rechargeable battery with a constant voltage and a constant current.

* * * * *